United States Patent [19]

Caschera

[11] Patent Number: 5,063,385
[45] Date of Patent: Nov. 5, 1991

[54] RADAR WARNING RECEIVER COMPRESSED MEMORY HISTOGRAMMER

[75] Inventor: Joseph Caschera, Fairborn, Ohio

[73] Assignee: The United States of America as represented by the Secretary of the Air Force, Washington, D.C.

[21] Appl. No.: 684,074

[22] Filed: Apr. 12, 1991

[51] Int. Cl.⁵ .............................. G01S 7/36; H04K 3/00
[52] U.S. Cl. ........................................ 342/13; 342/14; 342/20
[58] Field of Search .................... 342/13, 14, 15, 20

[56] References Cited

U.S. PATENT DOCUMENTS

| | | | |
|---|---|---|---|
| H513 | 8/1988 | Dunne et al. | 342/14 X |
| 4,040,054 | 8/1977 | Overman | 342/13 |
| 4,146,892 | 3/1979 | Overman et al. | 342/20 |
| 4,209,835 | 6/1980 | Guadagnolo | 364/728.07 |
| 4,217,580 | 8/1980 | Lowenschuss | 342/13 |
| 4,547,727 | 10/1985 | Tsui et al. | 324/79 D |
| 4,721,958 | 1/1988 | Jenkin | 342/13 |
| 4,816,832 | 3/1989 | Gold et al. | 342/14 |
| 4,851,854 | 7/1989 | Drogin | 342/417 |
| 4,879,561 | 11/1989 | Inkol | 342/195 |
| 4,891,648 | 1/1990 | Jehle et al. | 342/20 |
| 4,959,559 | 9/1990 | Ziolkowski | 342/14 X |

Primary Examiner—John B. Sotomayor
Attorney, Agent, or Firm—Gerald B. Hollins; Donald J. Singer

[57] ABSTRACT

A memory system for histogramming the pulse descriptor word output of a radar warning receiver for initial processing of the received data for quickly determining the numbers and types of emitters in the system's environment. The disclosed apparatus histograms the number of pulses received in a given time interval versus scaled values of frequency and time differences of arrival plus it assigns available memory locations only when confirmed data is received. A typical histogram size of 1,024 (radio frequency) by 8,192 (time difference of arrival), or 8,388,608 pixels is disclosed along with comparisons and contrasts with less efficient conventional histogramming arrangements.

14 Claims, 9 Drawing Sheets

PRIOR ART

Fig. 1

PRIOR ART

RADAR WARNING RECEIVER COMPRESSED MEMORY HISTOGRAMMER

RIGHTS OF THE GOVERNMENT

The invention described herein may be manufactured and used by or for the Government of the United States for all governmental purposes without the payment of any royalty.

BACKGROUND OF THE INVENTION

This invention relates to the field of memory systems of the optimized or compressed data type—especially as used in data imaging.

Radar warning receivers have become an essential tool in the electronic warfare countermeasures art. As currently used, a radar warning receiver provides digitized signals representing the radio frequency spectrum location, the time of arrival, and other identifying data with respect to signals received from a distal radar transmitting apparatus.

Figure 1:
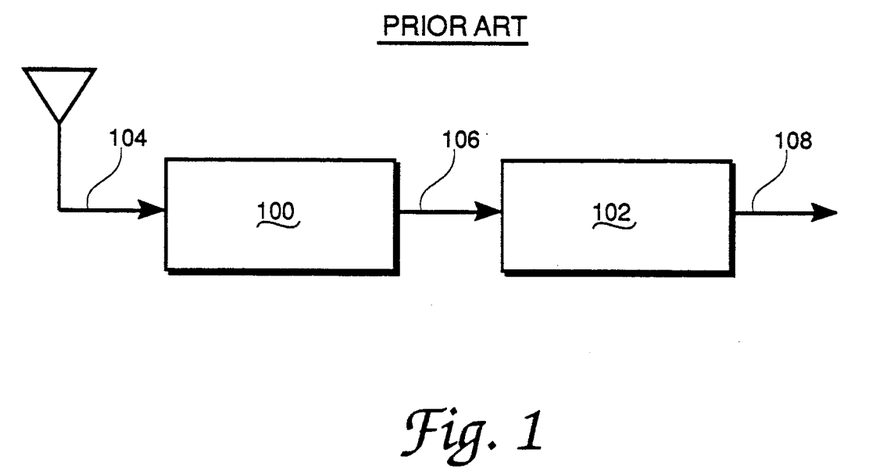
FIG. 1 shows a simplified radar warning receiver system.

A RWR (Radar Warning Receiver) field-of-view emitter environment can often consist of more than a thousand emitters with a combined density of several million PDW's (Pulse Descriptor Words) per second. Currently used RWR arrangements use pulse by pulse data processing techniques to generate a meaningful image from this type of input. FIG. 1 is an elementary block diagram of such a current RWR system. The RF (Radio Frequency) signal at 104 in FIG. 1 is encoded by the RF receiver 100 into PDW's which are sent along the path 106 to the system processor 102 where they are processed pulse by pulse and sent at 108 to the user. Pulse by pulse processing techniques rely on matching a number of pulse characteristics such as RF, AOA (Angle Of Arrival), TOA (Time Of Arrival) etc., with one another, then computing the PRI (Pulse Repetition Interval) for stable emitters or the range and characteristics for RF and PRI agility emitters. For the pulse by pulse processing approach, however, missing and/or corrupted PDW's significantly complicate the problem of deinterleaving trains of pulses. Even in low density environments many pulses are often missed due to, for example, time overlap of two or more pulses received by the RWR. As the density of the environment increases, the percentage of missed and corrupted pulses can be expected to increase causing the RWR system to detect and identify many more emitters (false alarms) than are present in the environment or falsely identifying emitters in chaotic system operation and breakdown in system performance.

The histogram processing approach, however, is far less sensitive to missed and corrupted pulse measurements and when used with other techniques can provide reliable RWR system performance even in dense emitter environments. The histogramming approaches currently considered for RWR systems are, however, limited to low resolution histograms of RF and AOA and are largely used as presorters for conventional pulse by pulse processing techniques. This approach is to use the histogram to store a number of PDW's per RF/AOA cell. The histogram is used to keep track of the number of PDW's stored. When the number of PDW's reach a given number (e.g., twenty), the file of PDW's is processed using the conventional pulse by pulse processing approach.

AOA tends, however, not to be a desirable sorting parameter due to poor measurement accuracies. The bin data is still processed pulse by phase and therefore the problems associated with pulse by pulse processing are still present after such sorting. Processing the RF/AOA histogram itself as a low level image and using this information to determine the makeup of the emitter environment offers a significant improvement of the sorting, however.

Figure 2:
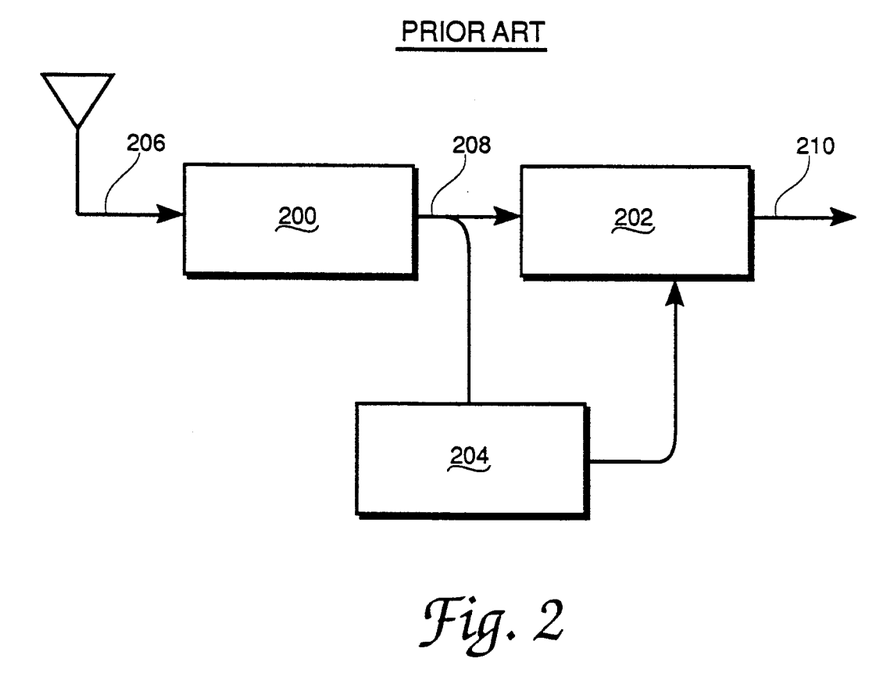
FIG. 2 shows a radar warning receiver system with a histogrammer.

A simplified block diagram of a RWR system with histogrammer is shown in FIG. 2. Histograms in the FIG. 2 system are small and usually include between 128 and 1024 pixels for the RF axis and 128 pixels for the AOA axis with the PDW count comprising the Z-axis. A histogram size ranging from 16,384 to 131,072 pixels or memory words is considered feasible and within the current state-of-the-art.

Efforts to extend the histogramming approach to RF and TDOA (Time Difference of Arrival) organized data have proven difficult and also suggest the present compressed memory histogrammer concept. Two major aspects of these difficulties are concerned with the amount of memory required to accomplish a meaningful histogram from the RWR and the time required to transfer the contents in the memory to a processor. A more detailed and exemplary description of this memory requirement consideration is presented in the detailed description portion of the present document appearing below.

The patent art indicates the presence of inventive consideration of radar image processing systems and their memories. Included in this patent art is U.S. Pat. No. 4,851,854 issued to E. M. Drogin and concerned with a memory intensive image sorter system. Although the Drogin apparatus is concerned with real time loading of a ram memory and the use of pixel identification parameters as addressed in the memory loading arrangement, the present invention is distinguished histogram organization of the stored data. The additional U.S. Pats. of K. R. Jenkin, U.S. Pat. No. 4,721,958, concerning a real time pulse processor; R. J. Inkol, U.S. Pat. No. 4,879,561, concerning a filter system for radar applications; and F. Jehle et al, U.S. Pat. No. 4,891,648, concerning an aircraft radar arrangement are also of general background interest with respect to the present invention.

SUMMARY OF THE INVENTION

The present invention provides for the histogram oriented storage of data signals originating in a radar warning receiver with emphasis on achieving a minimal cost and memory conserving storage arrangement in comparison with more straightforward or conventional storage approaches and for limiting the accessing memory locations for the transfer of data into a processor to only those memory locations containing data. The described system is based on the recognition that only a small percentage of the pixels generated in a warning receiver system will actually contain data to be displayed.

It is therefore an object of the present invention to provide a radar warning receiver histogram system that is requiring of minimum memory storage capability. It is another object of the invention to provide a radar warning receiver histogram system that is requiring of efficient memory storage data transfer capability.

It is another object of the invention to provide a histogram memory system which may be tailored in size according to the use under consideration.

It is another object of the invention to provide a memory optimized data storage arrangement that is optimally suited for histogram presentation of radio frequency, time of arrival, and number of targets displayed.

It is another object of the invention to provide a radar warning receiver memory arrangement which achieves improved economy with respect to more conventional direct histogram memory arrangements.

Additional objects and features of the invention will be understood from the following description and the accompanying drawings.

These and other objects of the invention are achieved by the method for economically preserving radar warning receiver generated pulse descriptor words for subsequent histogram organized processing comprising the steps of; initializing each location of a frequency characterizing pulse descriptor word portion first memory and a time difference of arrival second memory to flag bit active predetermined initial condition; storing, in a location of said first memory accessed by the frequency characterizing portion of a pulse descriptor word received from said receiver, the current contents of a first counter circuit; remembering the time of arrival of said pulse descriptor word in a last time of arrival third memory; incrementing the contents of said first counter circuit by one count; computing the time difference of arrival value between each new pulse descriptor word from said receiver and the remembered time of arrival stored in said third memory; said storing, remembering and computing steps being inhibited and said computing step enabled, however, by prior deactivation of said flag bit in said first memory accessed location; addressing a location in said time difference of arrival second memory with said computed time difference of arrival value; testing said addressed second memory location for presence said second memory predetermined initial flag bit active condition therein; setting the contents of said addressed second memory location to the present contents of a second counter circuit; indexing the contents of said second counter circuit by one count; said setting and indexing step being inhibited, however, by prior deactivation of said flag bit in said addressed second memory location; incrementing the count in a histogram organized fourth memory location identified by the combined stored data an active pixel fifth memory, in the first available location therein, the most recently stored values and storage location from said frequency characterization first memory and said time difference of arrival second memory; whereby active only pixel storage and reduced memory size requirements for said active pixel fifth memory prevail in comparison with direct recordings therein.

DETAILED DESCRIPTION

In the present description of the invention as well as in the text above, use is made of two, three and four letter acronyms in naming the signals or components of the described apparatus. Such shorthand is believed to appreciably shorten and simplify the text of the present document. A believed complete listing of these acronyms in alphabetical order is shown in Table 1 below. The acronyms are also identified at the point of first usage in the text.

TABLE I

| | |
|---|---|
| AOA | Angle of Arrival |
| CAM | Contents Addressable Memory |
| DRAM | Dynamic Random Access Memory |
| EGA | Enhanced Graphics Adapter |
| EW | Electronic Warfare |
| FIFO | First In First Out (memory) |
| IFM | Instantaneous Frequency Measurement |
| LTOA | Last Time of Arrival |
| PDW | Pulse Descriptor Word |
| PRF | Pulse Repetition Frequency |
| PRI | Pulse Repetition Interval |
| Pixel | Image resolution cell |
| RF | Radio Frequency |
| RWR | Radar Warning Receiver |
| SRAM | Static Random Access Memory |
| TDOA | Time Difference of Arrival |
| TOA | Time of Arrival |

According to conventional wisdom in the art, in order to histogram a wide bandwidth receiver having, for example, a bandwidth of 2000 Mhz, requires a RF axis of 1,000 pixels at a resolution of 2 Mhz. Additionally, for an emitter having PRF capability ranging from 125 to 300,000 pulses per second, a TDOA axis of 8,000 pixels at a resolution of one microsecond is required and, for a dwell period of 50 milliseconds at the maximum PRF, a pulse count of 15,000 pulses per pixel is needed. To histogram a matrix of 1,000 by 8,000 pixels with a pulse count of 15,000 pulses by conventional memory techniques therefore requires an 8,000,000 by 14 bit memory.

Since digital memories are organized in power-of-two units, with use of the next larger memory size, such a histogrammer would have a size of 1,024 by 8,192 pixels of 16 bits, or a memory capacity of 16,777,216 bytes organized as 8,388,608 words. To implement this memory would require 512 current state-of-the-art 32,768 by 8 bit high speed SRAM's (Static Random Access Memories). To access each memory location or each pixel at a 10 Mhz rate would require more than 0.8 second. Such memory size and readout time are, however, prohibitive and unacceptable of real time receiver operation.

The apparatus described herein overcomes these limitations and provides:

(1) a significant reduction in memory requirements for histogramming of the exemplary 1,024 by 8,192 possible values of RF and TDOA and (2) transfer of only active pixel data from the histogrammer to the RWR system computer to significantly improve real time operation.

A significant factor in reducing the memory requirements for a histogrammer memory is the fact that only a small percentage of pixels for a given collection period actually contain data. For a dense emitter environment containing a maximum of 500 emitters covering a 2,000 Mhz bandwidth and allowing an average of 12 pixels per emitter, the number of active pixels is only 6,000 out of a possible 8,388,608 pixels.

Figure 3:
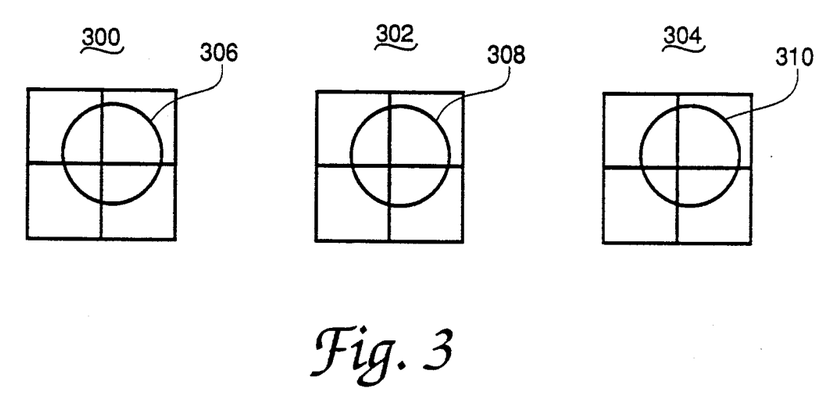
FIG. 3 shows the concept of pixel spread in graphic arrangement.

FIG. 3 shows an example of the expected pixel spread for a constant PRF emitter. In FIG. 3 the fundamental and two harmonics of a specific PRF are represented at 300, 302, and 304 respectively with TDOA being measured along the horizontal axes and radio frequency along the vertical axes. The area of uncertainty spreads at 306, 308 and 310 in FIG. 3 are caused by inaccuracies in the received signal measurements and missed pulses due to pulse on pulse overlap in the RWR system.

In addition, a constant PRI emitter will typically have less than 12 active pixels and an agile PRI emitter will have more than 12 active pixels. In a realistic average environment, 125 emitters are expected along with an active pixel count of 1,500. The systems described herein are arranged for a maximum of 2,048 active pixels comprising 128 emitters and a minimum of 1024 values of TDOA—since two or more emitters can have the same fundamental or harmonic TDOA values.

Figure 4:
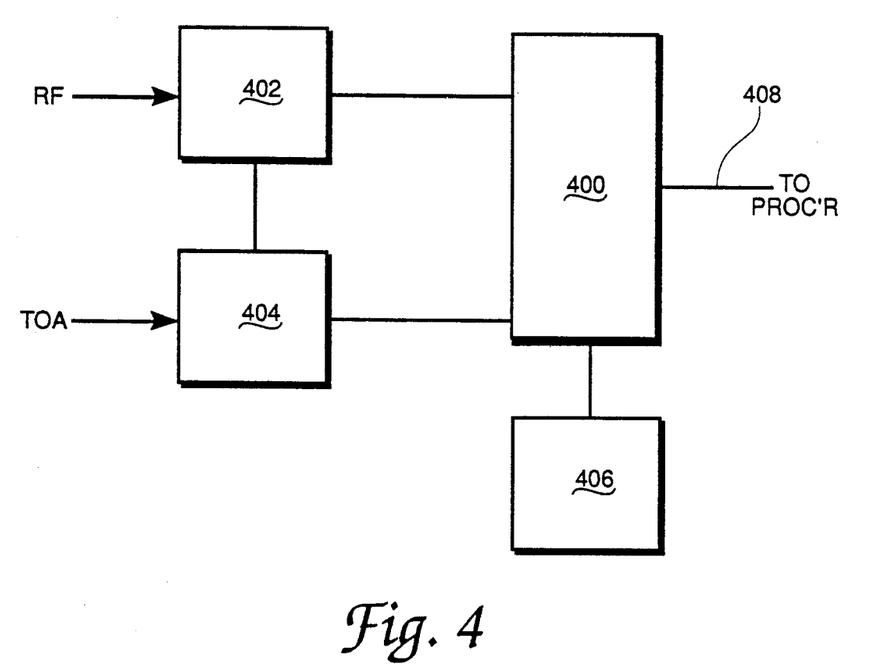
FIG. 4 shows a directly addressed memory histogrammer.

FIG. 4 shows one aspect of the invention in the form of a direct memory approach to a histogramming requirement of the described type. The FIG. 4 system includes a 24 bit by 8,192 word LTOA memory 402, a 16 bit by 8,388,608 word histogram memory 400, a TDOA computer or generator 404 and an incremental counter 406 for incrementing the accessed histogram memory location 400 by one.

During operation of the FIG. 4 direct memory histogrammer, the 24th bit of each location of the LTOA memory 402 is first set to one condition (this provides a flag bit at each location to indicate the location is empty). Ten bits of the PDW from a RWR representing RF are used to access the LTOA memory. If the 24th bit of an accessed location is a one, indicating the memory location is empty, then the 23 bits of TOA of the PDW are stored in that location as the LTOA and the 24th bit are set to zero. The next PDW having the same RF value will access this same LTOA memory location, but this time the accessed location's 24th bit is zero, indicating the memory location contains an LTOA value. The difference between the 23 bit LTOA value in the memory location and the current 23 bit TOA value from the RWR is calculated by the TDOA generator 404. For valid TDOA values between 1 and 8191, the TDOA generator generates a 13 bit TDOA word. The 10 bits of RF and 13 bits of TDOA are used to access the 8,388,608 word histogram memory 400. The value at the location accessed by the RF/TDOA field-that is, a pulse count value, is incremented by one. This procedure is repeated for each PDW received from the RWR until the specified collection time period has elapsed. At the end of the given time period the histogram memory is read out, one location at a time.

If the contents of a memory location is not empty, the memory location that is the pixel address and its contents are transferred to the processor's memory along the path 408 and the value of the accessed histogram memory location reset to zero. The read operation is continued until all of the histogram memory is accessed and data transferred to the processor. The LTOA memory is cleared, the 24th bits set to one, and the histogramming procedures then repeated. The histogram memory requirement here is 98,388,608 words, or 16,777,216 bytes. For real time operation, two FIG. 4 histogrammers are actually required, one histogramming RWR data while the other is off-loading its data to the processor. The disadvantages of the FIG. 4 direct memory approach to RWR histogramming include, of course, the large amount of memory required at 400 and the time required to transfer the data to the processor.

Figure 5:
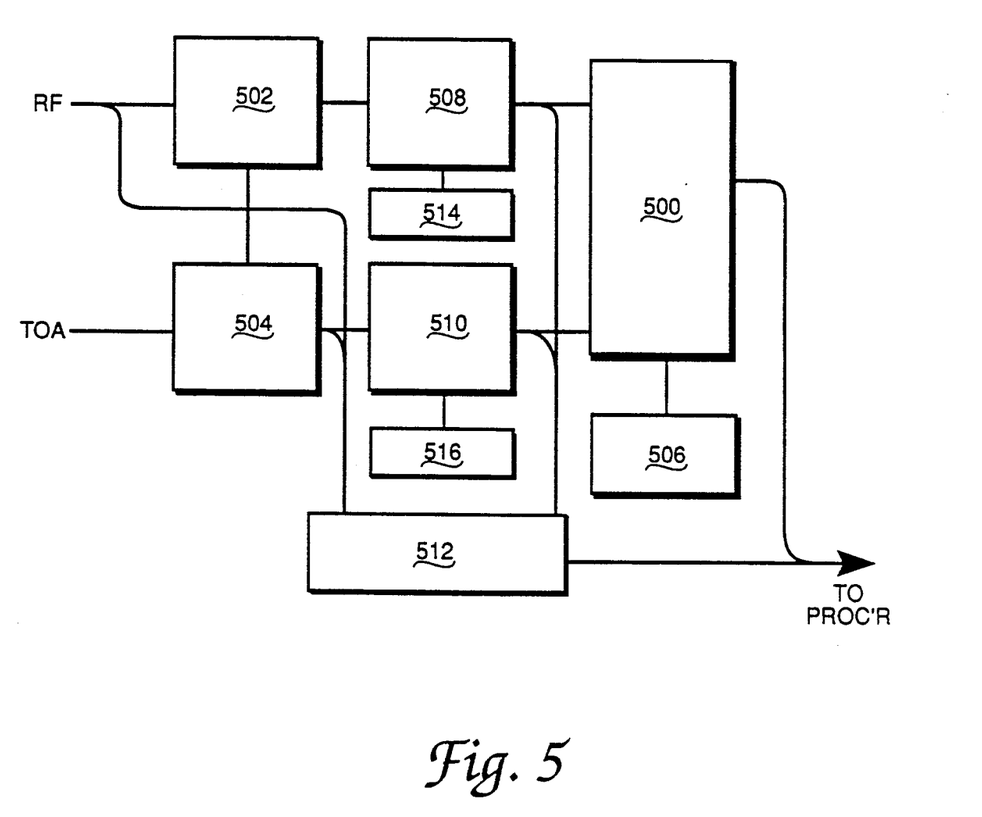
FIG. 5 shows a compressed memory histogrammer according to the invention.

FIG. 5 is a simplified block diagram of a compressed memory histogrammer according to the invention. FIG. 5 uses numbers similar to FIG. 4 where appropriate for reading simplification. In FIG. 5, three additional memory blocks 508, 510, and 512 are added and the main histogrammer memory 500 is significantly reduced in size.

In the FIG. 5 compressed memory configuration, the RF and TDOA outputs are not used to access the histogrammer memory directly. Instead these outputs are directed to the two small memories 508 and 510. A 1,024 by 8 bit memory is used at 508 for RF (one 2,048 by 8 bit SRAM) and an 8,192 by 12 bit memory used at 510 for TDOA (two 8,192 by 8 bit SRAM's). Also added to the FIG. 5 system are the two memory counters 514 and 516.

In the operating the FIG. 5 system, at power up, all locations or words of the RF memory 508 are set to 128 (8th bit set to one) and each location of the TDOA memory 510 is set to 2,048 (12th bit set to one). No flag bit is required for the LTOA memory for this configuration. When a PDW from the RWR is received, the RF bits access both LTOA memory 502 and the RF memory 508. If the 8th bit of the accessed location of RF memory 508 is set and this is the first PDW received, the contents of the RF memory counter 514 which is zero for the first PDW received is stored in the accessed RF memory location, the RF memory counter 514 is incremented by one count and the TOA stored in the LTOA memory 502.

The second PDW received from the RWR again accesses both the LTOA memory 502 and the RF memory 508 as before. If the 8th bit of the accessed location in RF memory 508 is set, the RF memory counter 514 value which is now one is stored in the accessed RF memory location and the RF memory counter is incremented to 2 and the TOA of the second PDW stored in the LTOA memory. This procedure is repeated for new RF values until the RF counter overflows, or the data collection period of typically 60 milliseconds expires.

When a PDW accesses a RF memory location that contains a value less than 128 (indicating that at least two PDW's having the same RF value have been received form the RWR), the value stored in the LTOA memory 502 for that RF value is compared with the current TOA and the time difference of arrival calculated. If the location in TDOA memory 510 is set to 2,048, that is the 12th bit is set to one, the accessed memory location is set to the TDOA memory counter 516 value beginning with zero and the TDOA memory counter 516 is incremented by one. This procedure is repeated for new TDOA values until the TDOA memory counter overflows, or the data collection period expires.

During utilization of this stored data the value stored in the RF memory word (0 to 127) is combined with the value stored in the TDOA memory word (0 to 1,023) and this combined value of 17 bits used to access a location in the histogram memory 500. The value at the accessed histogram memory location is then incremented by one.

If the contents of the histogram memory 500 before incrementing indicates that this is a new active pixel (an all zero condition) then the histogram address (17 bits) and the pixel address (10 bit RF, 13 bit TDOA) are stored in the first available memory location of the active pixel memory 512. The next active pixel will be stored in the second location of the active pixel memory 512 and so on. The size of the actual pixel memory 512 is 2,048 by 40 bits—23 bits for the pixel address and 17 bits for the histogram address. This can be accomplished by five 2,048 by 8 bit SRAM's.

In perspective, a total of six 2,048 by 8 bit and two 8,192 by 8 bit SRAM's have been added to the FIG. 5 system configuration, but in return the main histogram memory 500 has been reduced from five hundred twelve to eight of the 32,768 by 8 bit SRAM's. The LTOA memory requirement remains the same at three 2,048 by 8 bit SRAM's in both the FIG. 4 and FIG. 5 storage approaches.

Data is read from the FIG. 5 system by sequentially accessing the active pixel memory 512 rather than the histogram memory 400 as in FIG. 4. The active pixel memory 512 contains both the pixel address (23 bits) and the histogram address (17 bits). During readout, the first location of the active pixel memory 512 is accessed and the pixel address is first transferred to the processor. The 13 TDOA bits are used to access the TDOA memory 510 and 17 histogram address bits are used to access the histrogram memory 500.

The pixel count data from the histogram memory 500 is next transferred to the processor. The accessed TDOA memory location is set to 2,048 and the histogram location cleared to zero. The processor at this point has received both the pixel address of 10 bits RF and 13 bits TDOA and the pixel count data (16 bits) for the first active pixel memory location. The procedure is then repeated for the next subsequent active pixel memory location.

Since the number of active pixels is known, only active pixel data is read from memory and data transferred to the RWR processor in the FIG. 5. If, for example, during a given dwell period 500 pixels are active, only 500 locations in the histogram memory 500 are read and data transferred to the RWR processor. This, of course, improves the overall performance of the system. After all the active pixels have been read each location of the LTOA and RF memories 502 and 508 are cleared and the 8th bit of the RF memory set to one. This step is necessary because some memory locations may contain a single PDW whereas two are necessary to activate the TDOA circuits that result in an active pixel address being generated. If an overflow occurs in either the RF or TDOA memories 508 and 510, the bandwidth output of the RWR can be portioned into two or more subbands with each subband histogrammed separately. This would increase the time required to histogram the total band, but can be expected to occur only rarely in worst case conditions.

The first advantage of the compressed data histogrammer over direct histogramming is the significant reduction in histogram memory size. Additionally, providing a list memory for the active pixels allows rapid transfer of pixel data to the processor. The SRAM requirements for the FIG. 5 compressed memory histogram approach entail: three 2,048 by bit chips for the LTOA memory as in the direct addressed memory histogrammer approach, one 2,048 by 8 bit chip for the RF memory, two 8,192 by 8 bit memories; for the TDOA memory, and eight 32,768 by 8 bit memories, for the histogram memories for a total of 19 SRAM's. In comparison, the SRAM requirements for the FIG. 4 direct histogramming approach are: three 2,048 by 8 bit memories for the LTOA memory and five hundred twelve 32,768 by 8 bit memories for the histogram memory for a total of 515 SRAM's. Clearly the memory savings with the FIG. 5 system are attractive.

For real time operation of the FIG. 5 system two histogrammers are again required; while one histogrammer is collecting data, the second is off-loading its data to a processor. At the end of each dwell period, the functions are reversed. The total memory count for real time operation for the FIG. 4 direct addressed memory histogram approach is 1,030 versus 38 for the FIG. 5 compressed data histogram approach.

The described compressed memory histogrammer has been emulated or modeled on an IBM compatible AT computer. A program listing which accomplishes this emulationer modeling is included in the appendix of this document. This listing includes six pages of code in the "C" computer language and uses an MS-DOS operating system. In this modeling, a laboratory IFM (Instantaneous Frequency Measurement) receiver simulating the missed PDW's resulting from pulse on pulse overlap, typical of many signal emitter environments, is used to exercise the histogrammer to verify the herein described concepts. FIG. 6 through 10 herein show the results of a single typical rub using the histogram emulation program. The histogram pixel listing for this particular typical run is shown in Table 1 at the end of this specification.

Figure 6:
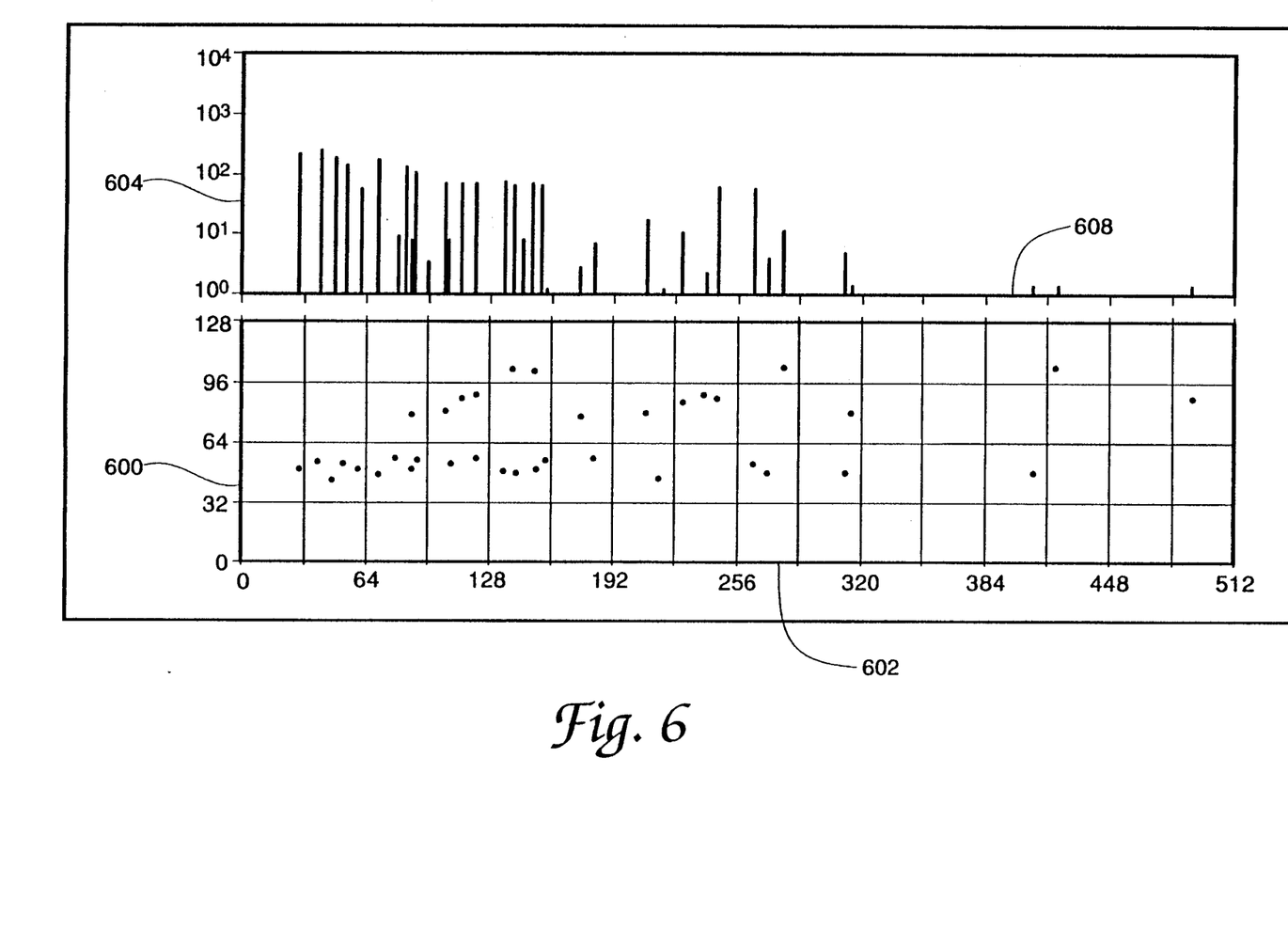
FIG. 6 shows an exemplary plot histogram achievable according to the invention.

FIG. 6 is therefore a display printout of a computer modeled histogrammer test consisting of an emitter environment containing 16 signals. The graphics display of a computer terminal equipped with an EGA (Enhanced Graphics Adapter) as used in FIG. 6 is not, however, capable of displaying the full range of the described histogrammer. In FIG. 6 the display histogram axes 600 and 602 represent 1024 RF, by 2048 TDOA, histogram pixels respectively, with each display pixel representing 8 RF and 4 TDOA histogram pixels. The combined PDW count along the axis 604 versus TDOA along the axis 608 is shown in the upper part of FIG. 6.

Figure 7:
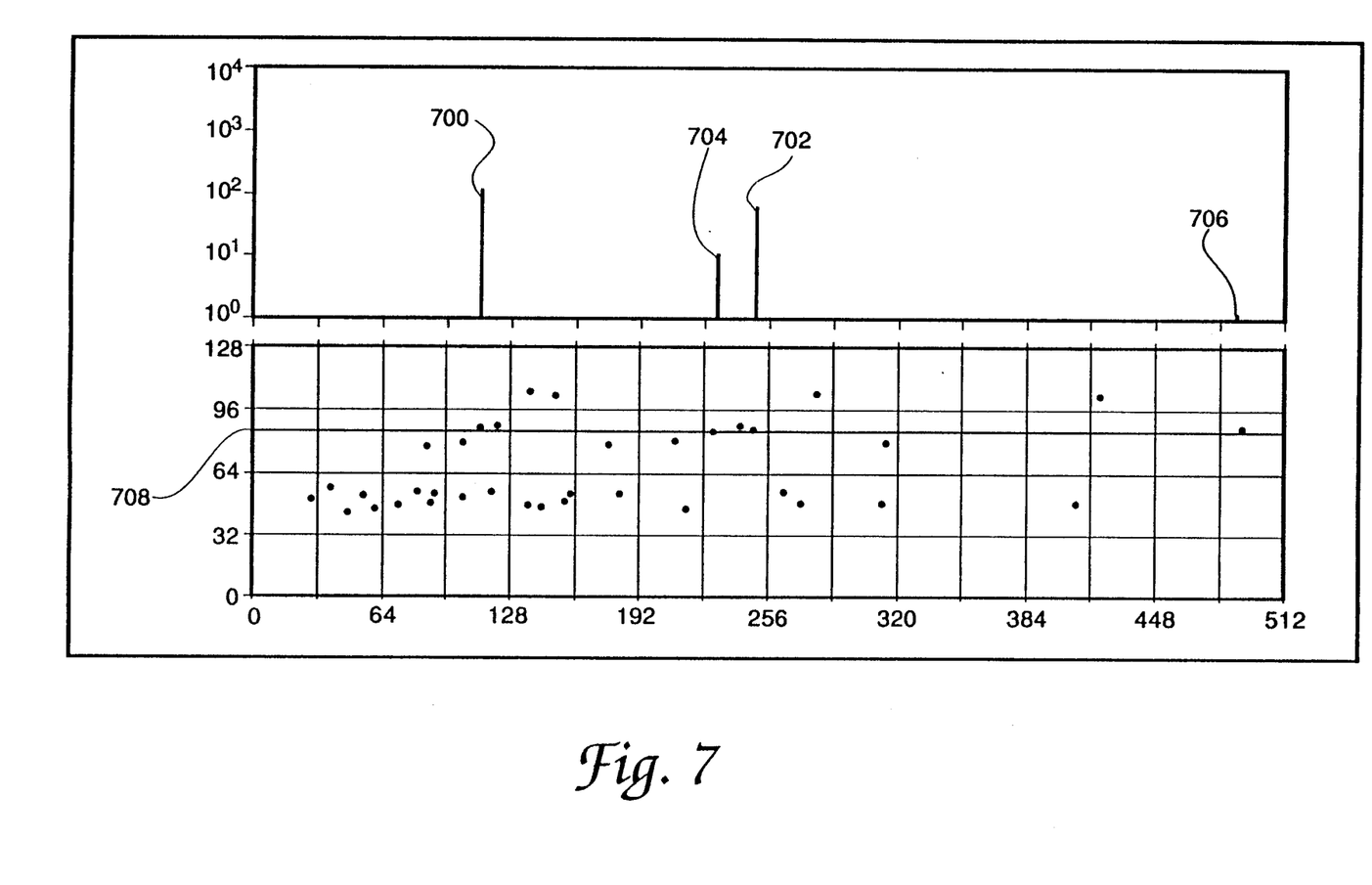
FIG. 7 shows a single RF value histogram plot of FIG. 6.

FIG. 7 is a display printout similar to FIG. 6 of the pulse count at a single RF value where RF equals 88 as shown at 708. From the PDW display and TDOA positions, FIG. 6 appears to show two signals. The first and third values at 700 and 702 actually represent the fundamental and second harmonic of one signal. The second at 704 and fourth, a single pulse count at 706 at the extreme right, represent the fundamental and second harmonic of the second signal.

Figure 8:
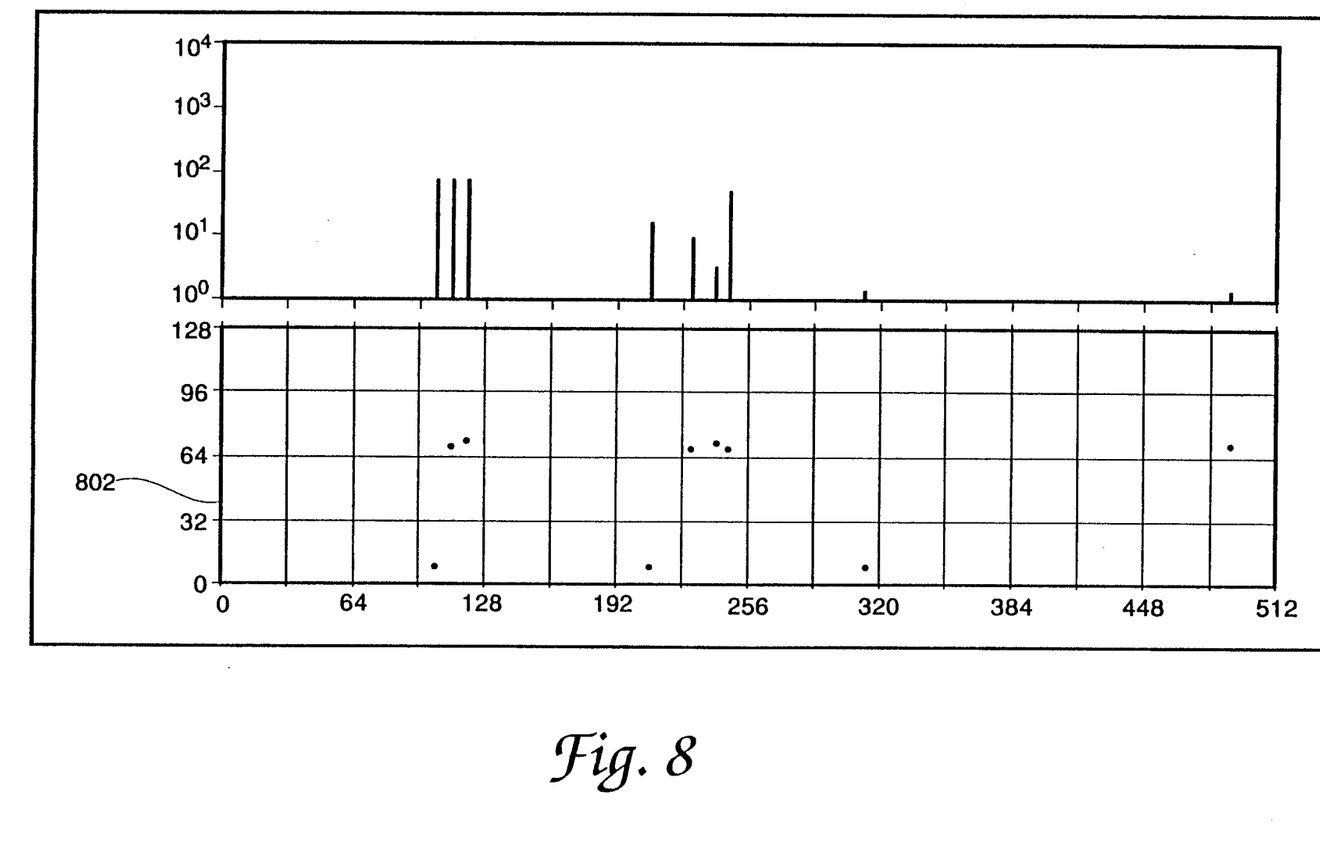
FIG. 8 shows a magnified portion of the histogram plot of FIG. 6 achievable with the system of the present invention.
Figure 9:
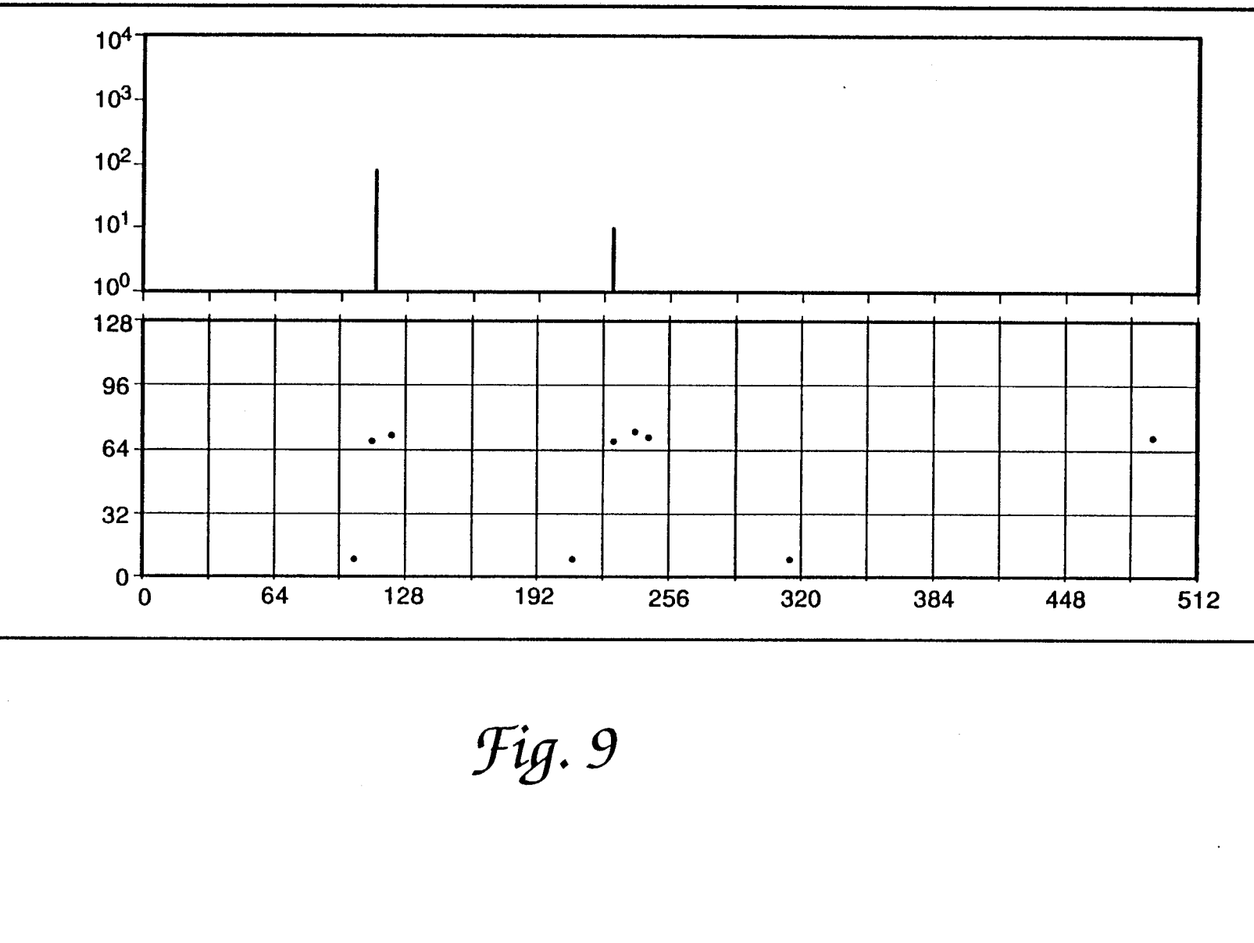
FIG. 9 shows a single RF value of the histogram plot in FIG. 8.
Figure 10:
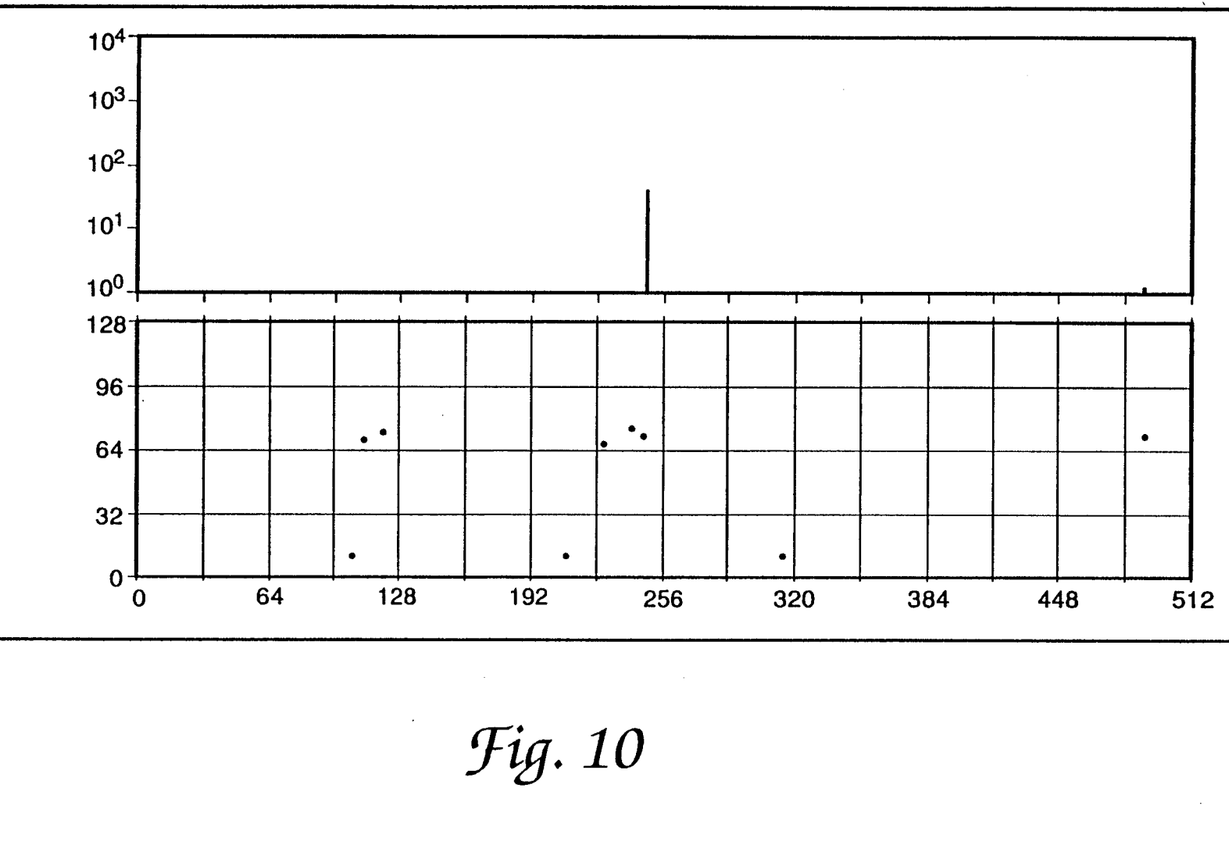
FIG. 10 shows another single RF value histogram plot of FIG. 8.

In FIG. 8 the RF axis of FIG. 7 has been magnified even though the RF scale 802 appears similar to the scale in FIG. 7. The display histogram of FIG. 8 actually represents 128 RF by 2048 TDOA histogram pixels with each display pixel now representing one RF by four TDOA histogram pixels. The RF axis 802 of FIG. 8 now actually represents the RF axis from 80 to 96 in FIG. 7. The RF value of 88 in FIG. 7 now ranges from 64 to 72 in FIG. 8.

An examination of the pixel display in FIG. 8 now clearly shows the RF axis value 88 in FIG. 7 to contain two signals at RF values of 67 and 70. These signals are also shown individually in FIG. 9 and 10. This manipulation of the display data can be accomplished because pixel data has been collected and maintained at a high resolution in the described system. This capability has significant value in EW (Electronic Warfare) signal processing applications and is another disadvantage of the invention.

The system described herein is, of course, not limited to the 1204 by 8,192 pixel size. For example, if the same assumptions are made about the number of emitters and active pixels, the design can be extended to 2,048 by 32,768 pixels (67,108,864 pixels) merely by the addition of one 1,048 by 8 bit SRAM memory to the active pixel memory and replacing the two 8,192 by 8 bit TDOA memories and two 32,768 by 8 bit memories. This configuration would allow the histogramming of a 2,000 Mhz bandwidth receiver output to a resolution of 1 Mhz and TDOA from 0.125 microseconds to 8,192 microseconds at a resolution of 0.125 microseconds. This would raise the memory circuit count to 20 for one histogrammer, or 40 for a real time system with two histogrammers sequencing between the data collection and data transferring modes.

By contrast the FIG. 4 direct addressed memory histogrammer would require the same number of memory circuit for the LTOA memory, however, the histogram memory would increase from 512 to 409C for a total of 4099 for one histogram, or 8198 for a real time system.

The active pixel memory can also be implemented with FIFO (First In First Out) memories rather than SRAM's. The SRAM's can also be replaced with DRAM's (Dynamic Random Access Memories). DRAM's have a greater capacity per chip but have slower access times and require a refresh cycle.

Figure 11:
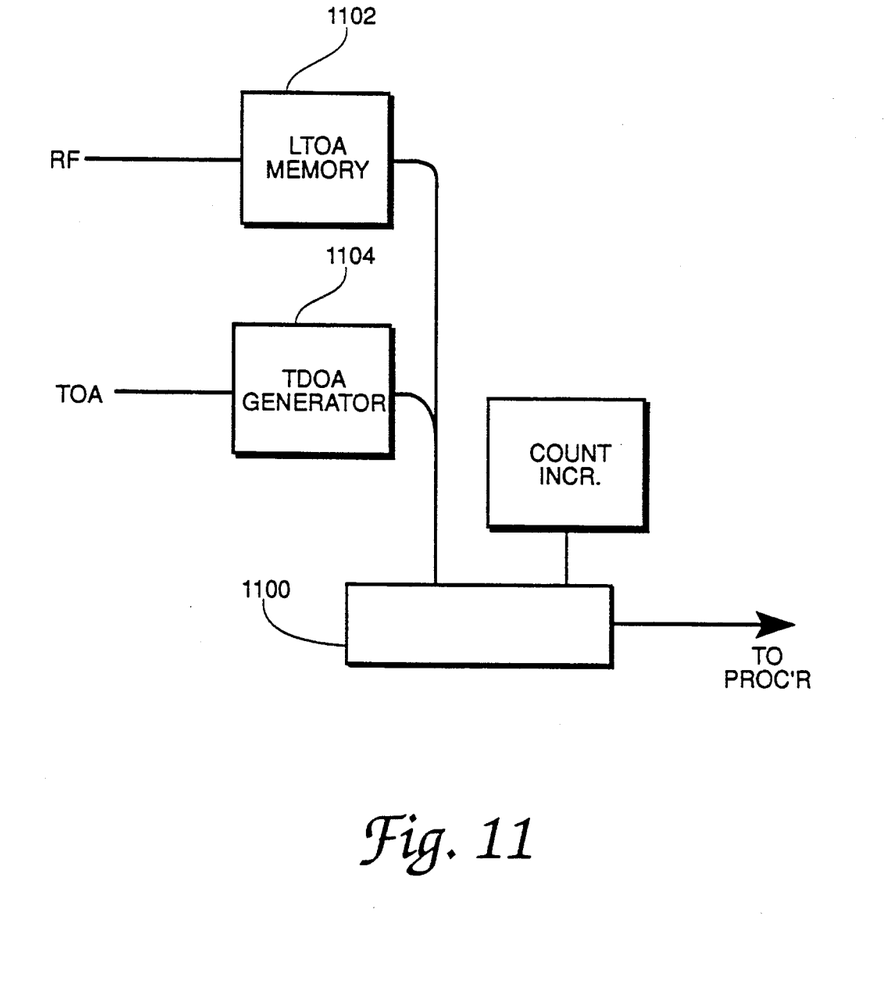
FIG. 11 shows an alternate arrangement of a histogram memory system.

The functions described herein can also be implemented with CAM's (Content Addressable Memories). FIG. 11 is a simplified block diagram of an RF/TDOA CMA array histogrammer. In this arrangement the RF memory, TDOA memory, histogram memory and active pixel memory of FIG. 5 are replaced by the 2048 by 48 bit array CAM's shown at 1100. The function and operation discussions above concerning the LTOA memory 1102 and the TDOA generator 104 are applicable to the FIG. 11 CAM design. The RF memory and TDOA generator outputs are used to interrogate the CAM array 1100 to determine if there is a matching pixel address. If there is no match, the pixel address is stored in the next vacant CAM location and the pixel count bits of the matched pixel location are incremented. At the end of the data collection period, the CAM array is read out one location at a time and the read location cleared.

A significant problem with CAM's is that they are limited to availability from one or two manufacturers. They are also expensive and not readily available off-of-the-shelf. A currently available unit is, however, organized into 64 to 48 bits. To implement the herein described capability with such devices would require 32 CAM circuit chips plus the LTOA memory and associated circuits versus the 19 SRAM's and associated circuits of the compressed memory configuration in FIG. 5. It is also notable that the future availability of CAM circuits is somewhat uncertain while both static and dynamic RAM circuits are becoming larger, faster, and less expensive.

The memory system described herein therefore provides several advantages over other possible data pre-processing arrangements. Especially notable in these advantages is a significantly reduced memory requirement for histogramming the disclosed embodiment 1024 by 8192 possible values of radio frequency and time difference of arrival and the rapid transfer of only active pixel data from the histogrammer to the processor memory for processing.

While the apparatus and method herein described constitute a preferred embodiment of the invention, it is to be understood that the invention is not limited to this precise form of apparatus or method, and that changes may be made therein without departing from the scope of the appended claims.

What is claimed:

1. A method for preserving radar warning receiver generated pulse descriptor words for subsequent histogram organized processing comprising the steps of:

initializing each location of a frequency characterizing pulse descriptor word portion first memory and a time difference of arrival second memory to flag bit active predetermined initial condition;

storing, in a location of said first memory accessed by the frequency characterizing portion of an arriving pulse descriptor word from said receiver, the current contents of a first counter circuit;

remembering the time of arrival of said pulse descriptor word in a last time of arrival third memory;

incrementing the contents of said first counter circuit by one count;

computing the time difference of arrival value between each new pulse descriptor word arriving from said receiver and the remembered time of arrival stored in said third memory;

said storing, remembering, and computing steps being inhibited and said computing step enabled, however, by prior deactivation of said flag bit in said first memory accessed location;

addressing a location in said time difference of arrival second memory with said computed time difference of arrival value;

testing said addressed second memory location for presence for said second memory predetermined initial flag bit active condition therein;

setting the contents of said addressed second memory location to the present contents of a second counter circuit;

indexing the contents of said second counter circuit by one count;

said setting and indexing step being inhibited, however, by prior deactivation of said flag bit in said addressed second memory location;

accessing a histogram organized fourth memory location by the combined stored data from said first and second;

testing said accessed fourth memory location for an initial volume of zero;

incrementing said accessed fourth memory location by one;

if initial state of said accessed fourth memory location prior to incrementing is zero;

recording in an active pixel fifth memory, in the first available location therein, the address parameters and the most recently stored values from said frequency characterization first memory and said time difference of arrival second memory;

whereby active only pixel storage and reduced memory size requirements for said active pixel fifth memory are achieved.

2. The method of claim 1 wherein the steps from said step of initializing through said step of incrementing end upon overflowing of said first counter.

3. The method of claim 1 wherein said steps of computing through incrementing end upon overflow of said second counter.

4. The method of claim 1 wherein said steps of initialing through incrementing and said step of computing through incrementing end with expiration of a data collection period.

5. The method of claim 1 wherein said first and second memory flag bits comprise higher ordered memory word bits and said flag bits are excluded from being set by data received in said memories.

6. The method of claim 1 wherein said combined first and second memory stored data includes a first predetermined number of data bits from said first memory and a second greater predetermined number of data bits from said second memory.

7. The method of claim 1 further including the steps of reading said warning receiver data from said active pixel memory during a sequential accessing of said memory.

8. The method of claim 7 further including the memory to processor data communication steps of:

sequentially accessing the data located in said active pixel fifth memory to obtain a sequence of pixel address and histogram address data words;

accessing the location in said time difference of arrival second memory and said histogram fourth memory using the histogram address contents of said accessed active pixel fifth memory data words as addresses;

communicating the pixel address data read from said fifth memory location to said processor;

transferring the contents of the accessed histogram memory location to said processor;

resetting said accessed time difference of arrival second memory words to said preset flag bit active condition;

clearing each said accessed histogram fourth memory location to the zero condition.

9. The method of claim 8 wherein said data communicating steps are limited to one sequence of sequentially accessing through clearing sequence for each active pixel.

10. The method of claim 8 further including the steps of clearing said last time of arrival third memory and said frequency characterizing first memory and presetting said flap bit predetermined conditions in said first memory.

11. Memory apparatus for efficiently capturing in histogram array the pulse data word output signals of a radar warning receiver comprising the combination of:

first digital counter means for incrementally accumulating the number of pulse descriptor words received from said warning receiver;

first memory means addressed by the frequency characteristic portion of a pulse descriptor word received from said warning receiver for conditionally storing the present contents of said first digital counter means;

third memory means for conditionally remembering the time of arrival of a pulse descriptor word from said warning receiver;

computation means for determining time difference of arrival values between a current pulse descriptor word and said third memory means stored pulse descriptor word time of arrival;

second digital counter means for conditionally incrementally accumulating the number of pulse descriptor words of identical radio frequency characteristic receive from said warning receiver;

second memory means addressed by said computed time difference of arrival for conditionally storing the incrementally accumulated present value in said second digital counter means;

histogram amplitude fourth memory means including memory locations addressable by data word combinations from said first and second memory means for counting in each respective addressed location thereof, the number of first memory means and second memory means identified pulse descriptor words located in a related histogram map cell, fifth active pixel memory means for sequentially storing the frequency characteristic and time difference of arrival componented histogram pixel address words and histogram amplitude address words for each active pixel in said histogram map.

12. The memory apparatus of claim 11 further-. including:

initial conditioning means responsive to a power up signal for presetting a flag bit in each location of said first memory means, means responsive to the undisturbed presence of said preset flag bit in said first memory means addressed location for enabling said conditional storage of said first digital counter means present value in said first memory means and subsequent incrementing of said first digital means;

means responsive to the absence of said preset flag bit for enabling said conditional time difference of arrival remembering in said second memory means.

13. The memory apparatus of claim 12 further including initial conditioning means responsive to a power up signal for presetting a flag bit in each location of said second memory means;

means responsive to the undisturbed presence of said preset flag bit in said second memory means addressed location for enabling said conditional storage of said second digital counter means present value in said second memory means and subsequent incrementing of second digital counter means;

means responsive to the undisturbed presence of said preset flag bit in said second memory means addressed location for enabling said conditioned incrementing of said histogram amplitude fourth memory.

14. The memory apparatus of claim 13 further including:

means for sequentially accessing the data located in said active pixel fifth memory means to obtain a sequence of histogram pixel address and histogram amplitude address data words therefrom;

means for reading into said processor the histogram pixel address data in said active pixel fifth memory and also said histogram amplitude fourth memory means data words, using said accessed fifth memory means histogram amplitude memory address data as addressed.

* * * * *

UNITED STATES PATENT AND TRADEMARK OFFICE
CERTIFICATE OF CORRECTION

PATENT NO. : 5,063,385
DATED : November 5, 1991
INVENTOR(S) : Joseph Caschera It is certified that error appears in the above-identified patent and that said Letters Patent is hereby corrected as shown below:

Col 2, line 36, after "distinguished" insert -- over the Drogan system by inter alia its orientation toward a --.
Col 3, line 46, after "data" insert -- from said first and second memories by one count; recording in --.
Col 6, line 8, "98,388,608" should be -- 8,388,608 --.
Col 6, line 32, delete the first occurrence of "the".
Col 6, line 60, "form" should read -- from --.
Col 9, line 14 "disadvantage" should read -- advantage --.
Col 9, line 21, "1048" should read -- 2048 --.
Col 9, line 47, "CMA" should read -- CAM --.
Col 9, line 66, "to" should read -- by --.
Col 11, line 56, "flap" should read -- flag --.
Col 12, line 11, "receive" should read -- received --.
Col 12, line 28, "further-." should read -- further --.

Signed and Sealed this

Eighth Day of June, 1993

*Attest:*

MICHAEL K. KIRK

*Attesting Officer*   *Acting Commissioner of Patents and Trademarks*